No. 675,261. Patented May 28, 1901.
G. F. BARTON.
HUB BRAKE.
(Application filed June 12, 1900.)
(No Model.) 3 Sheets—Sheet 1.
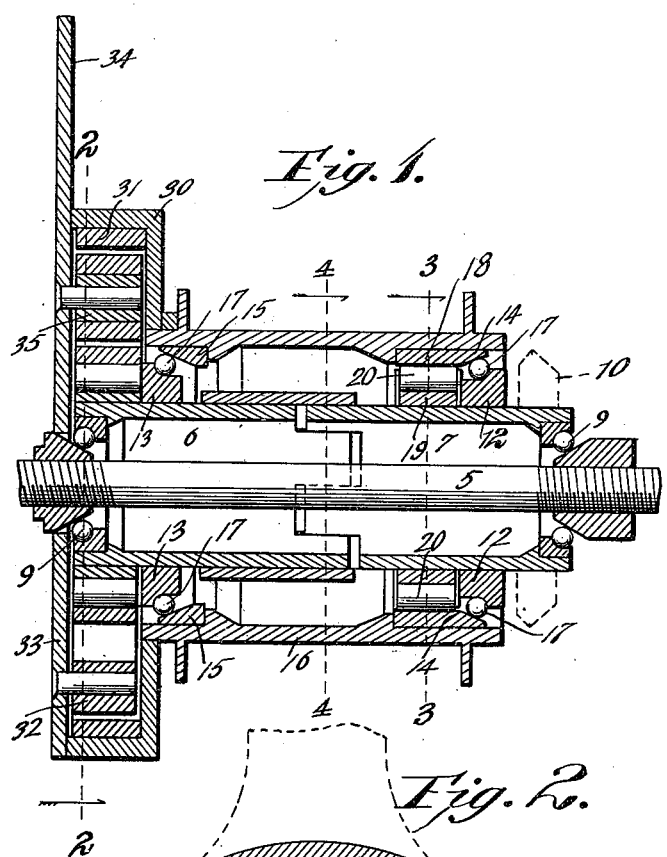
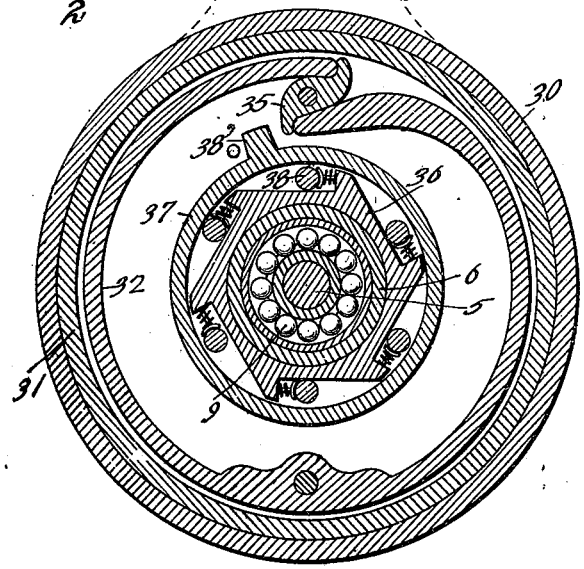
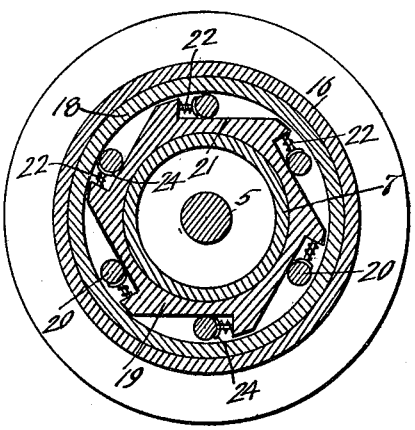
Witnesses
E. H. Walker.
Geo. H. Chandlee.
G. F. Barton Inventor
By C. A. Snow & Co.
Attorneys
THE NORRIS PETERS CO., PHOTO-LITHO., WASHINGTON, D. C.

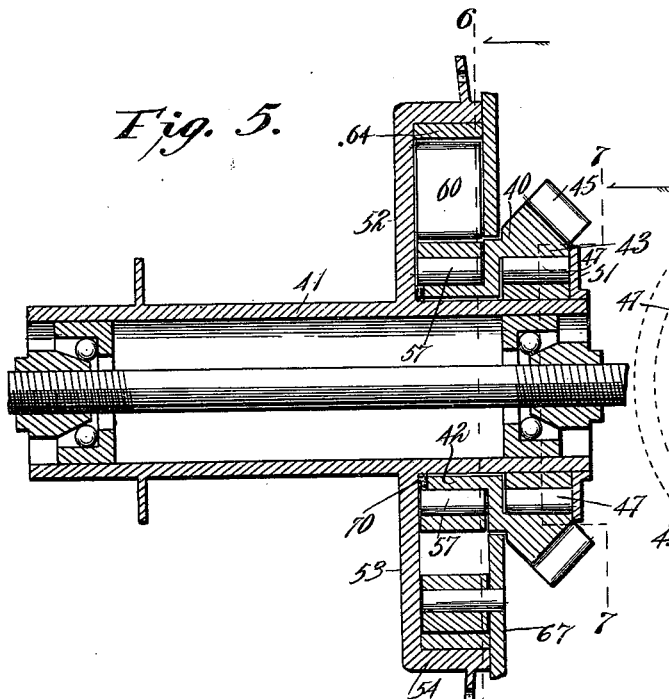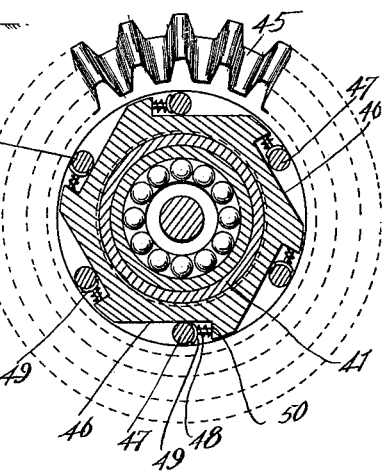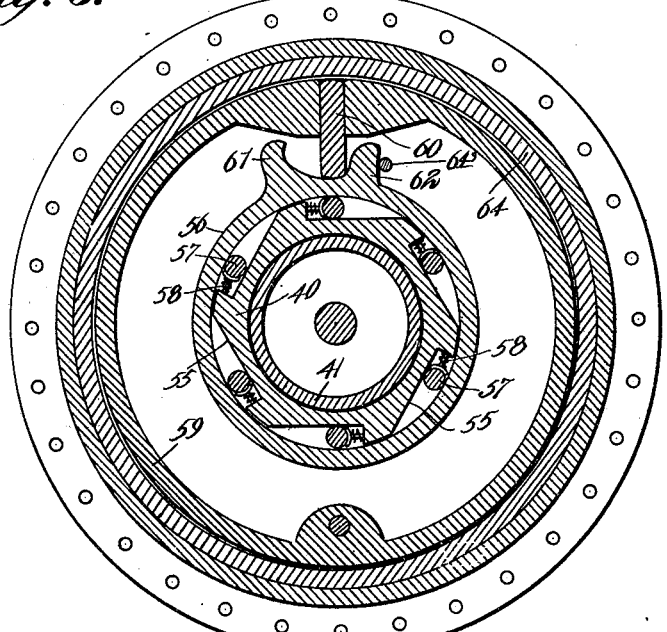

No. 675,261. Patented May 28, 1901.
G. F. BARTON.
HUB BRAKE.
(Application filed June 12, 1900.)
(No Model.) 3 Sheets—Sheet 3.

Witnesses
C. H. Walker
Geo. H. Chandler

G. F. Barton, Inventor.
by C. A. Snow & Co.
Attorneys

UNITED STATES PATENT OFFICE.

GEORGE F. BARTON, OF ELMIRA, NEW YORK.

HUB-BRAKE.

SPECIFICATION forming part of Letters Patent No. 675,261, dated May 28, 1901.

Application filed June 12, 1900. Serial No. 20,069. (No model.)

*To all whom it may concern:*

Be it known that I, GEORGE F. BARTON, a citizen of the United States, residing at Elmira, in the county of Chemung and State of New York, have invented a new and useful Hub-Brake, of which the following is a specification.

This invention relates to brakes in general, and more particularly to the class of hub-brakes commonly used upon bicycles and similar vehicles, one object of the invention being to provide a cheap and effective construction carried by the hub of a wheel and which will be thrown into operation when the driving member is moved reversely and will be inoperative when the driving member is moved forwardly.

Further objects and advantages of the invention will be evident from the following description.

Figure 8:
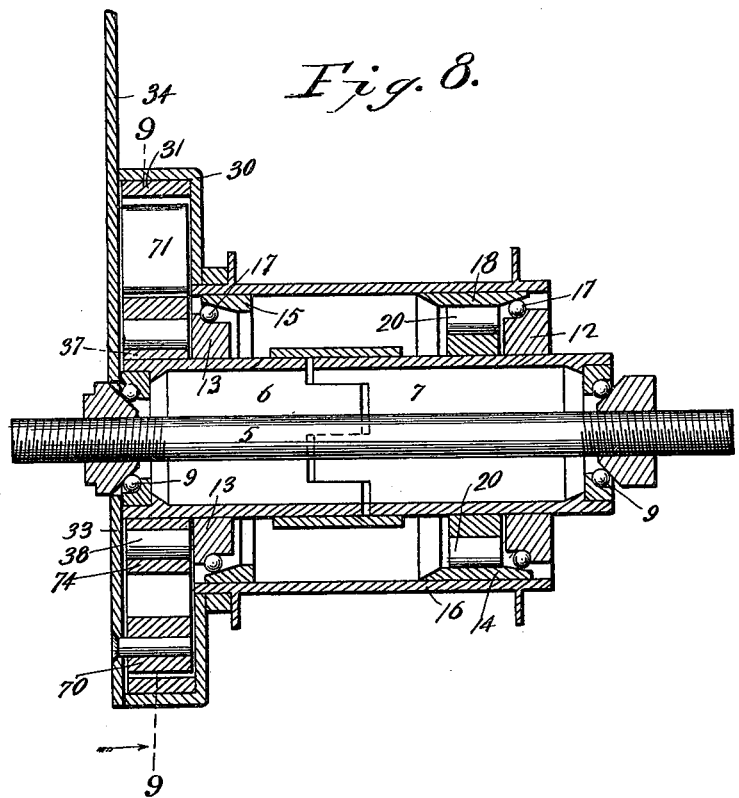
Figure 9:
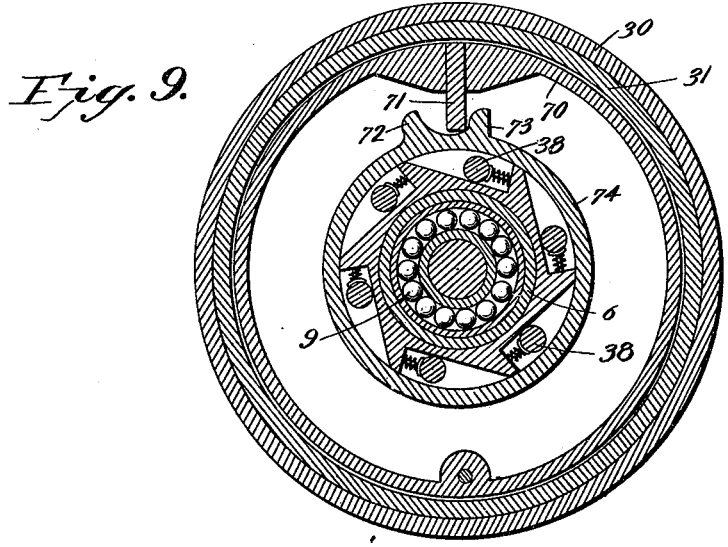

In the drawings forming a portion of this specification, and in which like numerals of reference indicate similar parts in the several views, Figure 1 is a longitudinal section taken through a wheel-hub equipped with the present invention. Fig. 2 is a section on line 2 2 of Fig. 1 and showing the brake-band and drum, as also the clutch mechanism through the medium of which the band is expanded when the drive mechanism is reversely moved. Fig. 3 is a section on line 3 3 of Fig. 1 and showing the clutch mechanism by means of which the wheel-hub is clutched to the driving member when the latter is moved forwardly. Fig. 4 is a section on line 4 4 of Fig. 1. Fig. 5 is a longitudinal section of a modification. Fig. 6 is a section on line 6 6 of Fig. 5. Fig. 7 is a section on line 7 7 of Fig. 5. Fig. 8 is a view similar to Fig. 1 and showing the use of the brake-ring and operating-block shown in the structure illustrated in Fig. 5. Fig. 9 is a section on line 9 9 of Fig. 8.

Referring now to the drawings, 5 represents the axle of the rear wheel of a bicycle, which is supported in the usual manner, and mounted upon this axle is a two-part sleeve comprising end sections 6 and 7, the adjacent ends of which are toothed for mutual engagement to prevent rotation of one section with respect to the other. These sections 6 and 7 carry races, which coöperate with other races upon the axle to receive bearing-balls 9, which carry the wheel when the latter is rotated forwardly. The section 7 of the sleeve carries a bevel-gear (shown in dotted lines at 10) or any other element for applying rotating power to the sleeve in both a forward and a rearward direction.

Upon the exterior of the sleeve-sections 6 and 7 and adjacent the outer ends thereof are fixed races 12 and 13, which coöperate with races 14 and 15 upon the inner surface of the wheel-hub 16 and adjacent the ends of the latter, the races having coöperating balls 17, as shown.

At one end of the hub 16 adjacent the gear 10 and interiorly of the hub there is disposed an annular clutch-ring 18, which is fixed to the hub, while upon the sleeve-section 7 is fixed a second clutch member 19, consisting of a wheel 19', having a notched periphery, one wall 22' of each notch lying parallel with a radius of the wheel, while the other or bottom wall lies at right angles thereto, the two walls being continued through to the periphery of the wheel and the several notches of the wheel being separated by slight interspaces, as shown. In each of these notches is disposed a cylinder 20, which lies against the bottom wall 21 of the notch and against the clutch-ring 18, the several cylinders being held in this position yieldably by means of helical springs 22, one end of each of which is disposed against a wall 22' of a notch and the other end against an arc-shaped plate 24, disposed to receive a portion of the side of a cylinder. Thus if the sleeve be rotated in one direction the cylinders will tend to roll against the tendency of the helical springs and the hub 16 will not be moved; but if the sleeve is rotated in a reverse direction then the cylinders will wedge in place and the hub will be clutched to the sleeve to rotate therewith.

Upon the end of the hub 16 opposite to the clutch mechanism just described there is formed an enlarged hollow brake-drum 30, having a bushing 31, of fiber or other suitable material, to form the friction-face of the drum, and this bushing coöperates with an expansible spring-metal brake-band 32, which is split and which is attached midway of its ends to a disk plate 33, which is disposed upon the axle 5 and in position to close the outer end of the brake-drum and hub, this plate having a radial extension 34, which may be secured to one of the fork sides or tie-rods to hold the plate in proper position against rotation.

Pivoted upon the plate 33 is a pivoted block or button, the ends of which are formed to receive and hold the ends of the brake-band, and this block or button when moved pivotally acts to separate the ends of the band, and thus expand the latter against the fiber bushing of the brake-drum to retard or stop rotation of the brake-drum, and therewith the hub.

To move the block 35 and expand the brake-band, a clutch-wheel 36, similar in every respect to the clutch-wheel 19, is fixed upon the sleeve-section 6 within the inclosure of the brake-drum, and surrounding which clutch-wheel is a clutch-ring 37, the inner surface of which forms a clutch-face, against which are wedged the cylindrical bodies 38, corresponding to the bodies of the clutch hereinbefore described. These cylindrical bodies when the clutch-wheel is rotated in one direction are wedged between the clutch-wheel and the clutch-ring, and when the clutch-wheel is moved in an opposite direction the cylinders move from their clutching positions and permit free movement of the ring. This clutch-ring has a radial lug 38', which is disposed to strike against the block 35 when moved in the direction thereof.

The operation of the mechanism is as follows: When the sleeve is rotated forwardly to drive the vehicle, the clutch-wheel 19 is operative and the clutch-wheel 36 is inoperative, and in consequence the wheel-hub 16, with which the felly is connected in the usual manner, is rotated to drive the vehicle. At the same time the brake-drum is rotating with the hub. If then the direction of rotation of the sleeve be reversed, the clutch-wheel 19 will become inoperative and the clutch-wheel 36 will clutch ring 37 to rotate therewith, moving the lug 38' against the block 35 and moving the latter pivotally to expand the clutch brake-band against the inner face of the bushing of the brake-drum. If this action be properly performed, the brake-drum, and therewith the hub, will be brought to complete rest, or just enough pressure may be applied to retard the progress of the vehicle to the proper degree.

In Figs. 5, 6, and 7 is shown a modification of the invention wherein the interior sleeve is omitted and in place thereof an exterior sleeve 40 is loosely disposed upon the hub 41, this sleeve 40 comprising a minor portion 42, which closely encircles the hub at a point distant from one end thereof, and a major portion 43, of somewhat greater internal diameter than the exterior diameter of the hub, this major portion 43 having a bevel-gear 45 formed thereon or secured thereto and through the medium of which the sleeve is rotated reversely for the purposes hereinafter set forth. Upon the hub 41 and within the inclosure of the major portion 43 of the sleeve there is disposed a fixed clutch member having the same form and corresponding to the member 19 in the first form of the invention described, the clutch-faces 46 thereof coöperating with the inner annular surface of the major portion of the sleeve, and between these coöperating faces are disposed a series of cylindrical bodies 47, which are held yieldably at the minor ends of the interspaces, in which they are disposed, by means of helical springs 48, encircling the stems of arc-shaped plates 49, disposed against the cylindrical members. Each of the helical springs bears at one end against the arc-shaped plate and at its opposite end against the radial wall 50, as shown. A cap-plate 51 is secured over the end of the sleeve 40 to prevent displacement of the cylinders, and with this construction it will be seen that if the sleeve is rotated in one direction the hub will be rotated with it, due to the operative engagement of the clutch members, and that if the sleeve is rotated in an opposite direction it will turn freely and independently of the hub. The active rotation of the sleeve just mentioned drives the hub forwardly to propel the vehicle upon which it is mounted, and in order to brake the hub when the sleeve is rotated oppositely to free it from the hub a brake-drum 52, which is hollow, is formed upon the hub and comprises a web portion 53 and a laterally-extending flange 54, said flange extending to inclose or encircle the minor portion 42 of the sleeve 40. Upon the outer surface of the minor portion of the sleeve 40 is fixed a clutch member 55, which is similar in every respect to the member upon the end of the hub and which coöperates with the major portion of the sleeve, this member 55 having its clutching-faces lying and extending in the same direction as those of the former member, but being carried by the sleeve this clutch member is operative when the sleeve is rotated in a direction opposite to that required for driving the hub. The clutch member 55 coöperates with a ring 56, which encircles it and has disposed between it and the inner face of the ring the clutching-rollers 57, which are held by helical springs 58 in the same manner and for the same purpose as the rollers in each of the other clutches mentioned. Upon the plate 67 is mounted a brake-band 59, of spring metal, and which is in the form of a split ring, and between the ends of the band is disposed a block 60, having a length somewhat greater than the thickness of the thickened ends of the band, so that it projects into the inclosure of the band to lie between the lugs 61 and 62 upon the ring 56. Thus when the clutch member 55 is operatively rotated the ring is clutched and rotated to engage lug 62 with the block and to give it pivotal movement and twist it so that it will pry the ends of the brake-band apart and expand the band against the inner face of the brake-drum, said drum having a friction-face 64 of suitable material. In order to hold the block 60 up into place when operated to expand the brake-band, the adjacent face of the lug is curved, as shown, whereby the block will be in constant engagement therewith and will be prevented from falling. The opposite movement of the ring 56 is prevented by a stop-pin 64' upon the plate 67, attached to the bicycle-frame. Thus when the sleeve is rotated in one direction its major end is clutched to the hub to drive it, and when rotated in an opposite direction its minor end is clutched to the brake-operating ring to operate the brake-band.

It will be understood that other modifications of the invention may be made and that any suitable materials and proportions may be used for the various parts and also that the sleeve may be rotated by means of a sprocket carried thereby instead of the bevel-gear. Furthermore, as shown in Fig. 5, a friction-washer 70 may be disposed between the end of the minor portion of the sleeve and the inner face of the brake-drum web to take the thrust upon the bevel-gear.

In Figs. 8 and 9 of the drawings there is shown the same construction as that illustrated in Figs. 1 and 2, with the exception that the brake-band 70 has the same form as that shown in Fig. 6, and between the ends thereof is a loose block 71, having no fixed pivot, the inner end of this block being disposed between lugs 72 and 73 on the ring 74 for operation thereby, as described in connection with Figs. 5 and 6. The lug 61 in Fig. 6 of the drawings may be omitted, if desired.

What is claimed is—

1. A hub-brake comprising a sleeve adapted for reversible rotation and having oppositely-disposed clutch members fixed thereon, a hub encircling the sleeve and carrying a brake-drum, a clutch member upon the hub in operative relation to one of the members upon the sleeve, a ring in operative relation to the second member upon the sleeve, a brake-band held at a point in fixed relation to the drum, and means engaged with both ends of the band for distorting the band to engage it with the drum, said means being operable by the ring when the latter is in operative relation to its coöperating clutch member.

2. A hub-brake comprising a sleeve adapted for reversible rotation and having oppositely-disposed clutch members fixed thereon, a hub encircling the sleeve and carrying a brake-drum, a clutch member upon the hub in coöperative relation to one of the clutch members upon the sleeve, a ring in coöperative relation to the second clutch member upon the sleeve and having a lug, an expansible brake-band for engagement with the drum, and means engaged with the ends of the band for separating the ends to expand the brake-band, said means lying in the path of movement of the lug of the ring for operation thereby.

3. A hub-brake comprising a sleeve adapted for reversible rotation and having oppositely-disposed clutch members fixed thereon, a hub encircling the sleeve and carrying a brake-drum, a clutch member upon the hub in coöperative relation with one of the clutch members upon the sleeve, a ring encircling the second clutch member upon the sleeve for coöperation therewith, said ring having a lug, a plate held adjacent the drum, an expansible brake-band fixed midway of its ends to the plate, and a movable block engaged with both ends of the band for expanding it, said block lying in the path of movement of the lug upon the ring for operation thereby.

4. A hub-brake comprising a sleeve, a hub, and a brake-operating ring having spaced lugs, a clutch mechanism between the sleeve and hub, a second clutch mechanism between the sleeve and ring, said clutch mechanisms being adapted for alternate operation as the sleeve is reversely rotated, a brake-drum carried by the hub, an expansible brake-band fixed intermediate of its ends, and a block having one end disposed between the ends of the band and the opposite end disposed between the lugs of the ring for alternate operation thereby to engage and release the band.

5. A hub-brake comprising a sleeve, a hub and a brake-operating ring, a clutch mechanism between the hub and sleeve, a second clutch mechanism between the sleeve and ring, said clutch mechanisms being adapted for alternate operation as the sleeve is reversely rotated, a brake-drum carried by the hub, a brake-band fixed intermediate of its ends in operative relation to the drum, said band being expansible against the drum, and means engaged with both ends of the band and operated by the ring for separating the ends of the band to expand the band.

6. A hub-brake comprising a hub, a sprocket, a brake-ring having spaced lugs, a clutch between the hub and sprocket, a second and oppositely-operable clutch between the sprocket and ring, a brake-drum connected with the hub, a brake-band fixed intermediate of its ends in operative relation to the drum for expansion against the drum, and a block disposed at one end between the ends of the band and at its opposite end between the lugs of the ring for movement by said lugs to separate the ends of the band and expand it.

In testimony that I claim the foregoing as my own I have hereto affixed my signature in the presence of two witnesses.

GEORGE F. BARTON.

Witnesses:
  C. H. OSBORNE,
  F. F. RIGGS.